United States Patent [19]
Hamada et al.

[11] Patent Number: 5,458,379
[45] Date of Patent: Oct. 17, 1995

[54] VALVE-COUPLING ASSEMBLY

[75] Inventors: Shinichiro Hamada, Tokyo; Makoto Mizokami, Tachikawa; Norio Tanahashi, Chiba; Takashi Doi, Kodaira; Naoki Homma, Hoya, all of Japan

[73] Assignee: Koganei Corporation, Tokyo, Japan

[21] Appl. No.: 333,772

[22] Filed: Nov. 3, 1994

[30] Foreign Application Priority Data

Nov. 5, 1993 [JP] Japan .................................. 5-059506 U
Jan. 21, 1994 [JP] Japan .................................. 6-004942

[51] Int. Cl.⁶ .................................................. F16L 25/00
[52] U.S. Cl. ........................... 285/39; 285/177; 285/319
[58] Field of Search ........................... 285/39, 177, 319

[56] References Cited

U.S. PATENT DOCUMENTS

| | | | |
|---|---|---|---|
| 3,817,561 | 6/1974 | Kay | 285/177 |
| 4,895,395 | 1/1990 | Ceriani | 285/39 |
| 5,069,424 | 12/1991 | Dennany, Jr. et al. | 285/319 X |
| 5,330,234 | 7/1994 | Scollny | 285/177 X |

*Primary Examiner*—John C. Fox

[57] ABSTRACT

A valve-coupling assembly comprising a manifold electromagnetic valve and couplings fitted thereto. The manifold electromagnetic valve is connected to the actuators through tubes respectively, and controls the operations of the respective actuators. Connecting members, each having pipe couplings connected thereto with tubes respectively, are detachably mounted on either one of the electromagnetic valves and a manifold block. With this arrangement, either of a manifold piping system and a valve piping system is selected. Either of a smaller-diameter tube and a larger-diameter tube is selectively connected to the aforesaid pipe coupling. Fastening of the tube connected and fastened to the pipe coupling is released by a fastening-releasing member, whereby the tube is easily removed and replaced by a tube having a diameter of a different size.

10 Claims, 12 Drawing Sheets

Fig. 4(a)
Fig. 4(b)
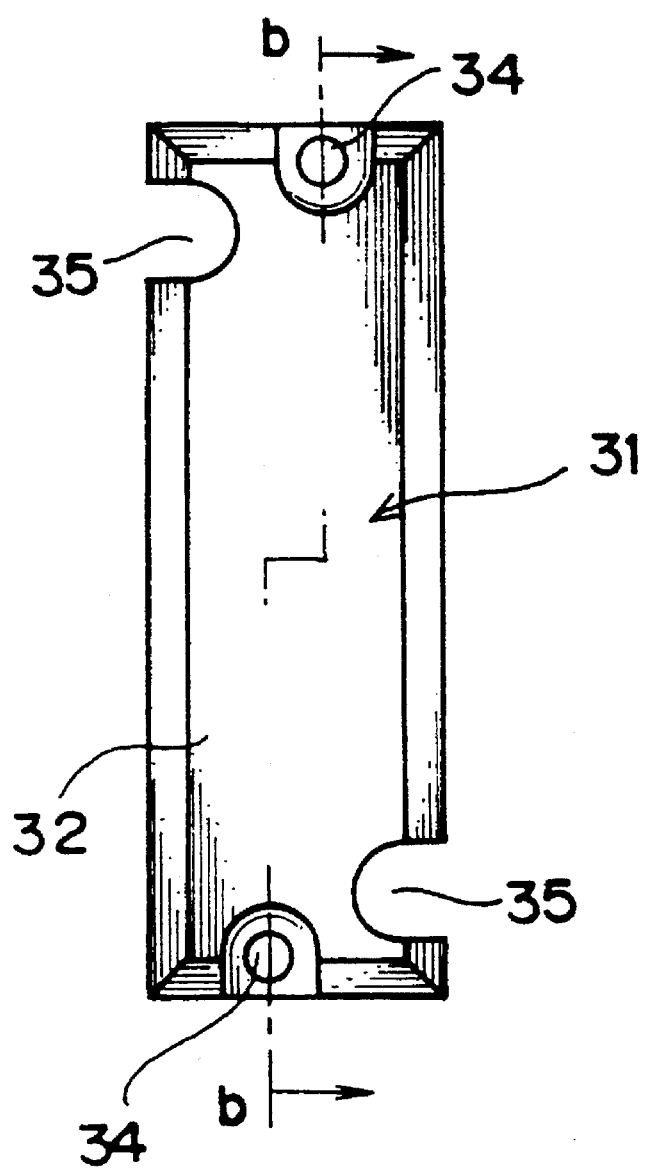
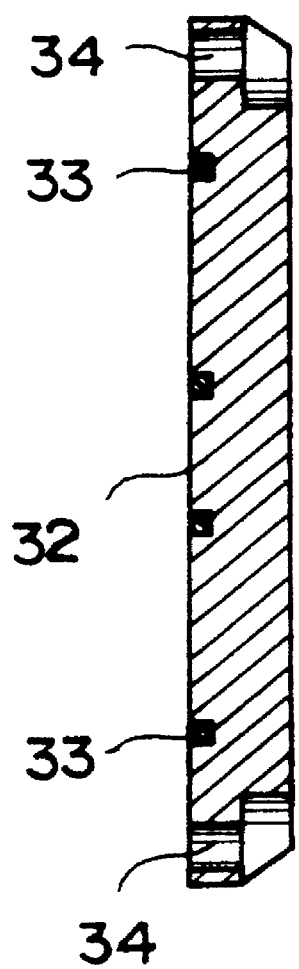

VALVE-COUPLING ASSEMBLY

BACKGROUND OF THE INVENTION

1. Field of the Invention

This invention relates to a valve-coupling assembly having a manifold electromagnetic valve for controlling supply of compressed air to pneumatic equipments and couplings for connecting tubes which respectively connect the manifold electromagnetic valve to the pneumatic equipments and guide the compressed air.

2. Related Art Statement

A manifold electromagnetic valve is an electromagnetic valve of a type, in which, normally, a plurality of electromagnetic valves are mounted on a manifold block formed therein with an air supply port and air exhaust ports and supply of air pressure to the respective electromagnetic valves and exhaust of air pressure therefrom can be performed commonly through the air supply port and the air exhaust ports formed in the manifold block. And, there has been developed such a manifold electromagnetic valve too wherein only an air supply port is formed in a manifold block and exhaust from respective electromagnetic valves is directly carried out from the respective electromagnetic valves. concentrically control a plurality of pneumatic equipments, for example, actuators such as air cylinders, so that a number of manifold electromagnetic valves are used in fields where a multiplicity of pneumatic equipments such as actuators are used as in an assembly line for parts or products.

As for connection between a plurality of electromagnetic valves mounted on the manifold block and pneumatic actuators such as air cylinders through the tubes for guiding air, there are two types of piping systems, i.e., a manifold piping system wherein the connection is made at the manifold block, and a valve piping system wherein the connection is made at the respective electromagnetic valves. The valve piping system has the advantage that the electromagnetic valves can be replaced together with the actuators, and the manifold piping system has the advantage that the electromagnetic valves can be exchanged without removing the tubes.

Selection of a piping system is determined depending on a place where the manifold electromagnetic valve is used. However, once either is selected, the selected system cannot be easily changed over to the other afterward. If a requirement of a piping system to be used is changed over to the other type, it is necessary to change the manifold electromagnetic valve over to the other type.

The manifold electromagnetic valve is connected to an actuator by use of a tube, and the tube is connected to the manifold electromagnetic valve through a pipe coupling. When the tube is connected to an output port of the manifold electromagnetic valve, the inner diameter of the tube is set so as to be suitable to the air flow rate through the tube.

Only tubes of one and same inner diameter size can be selected to be coupled to a normal pipe coupling and it has heretofore been impossible to interchangeably connect two kinds of tubes having different diameters from each other to a pipe coupling. However, in process of using a manifold electromagnetic valve, there may arise necessity for changing responsiveness of a pneumatic equipment, i.e., an operating speed of the equipment. In that case, the tube should be changed over to one different in inner diameter.

In this case, because only a tube having a particular diameter can be coupled to a conventional pipe coupling, so that, in order to connect a tube of a different diameter, the pipe coupling should be changed over to one having the size corresponding to the diameter of a new tube after the change, thereby making tube-exchanging work troublesome. Furthermore, it is necessary to prepare a plurality of pipe couplings in accordance with different tube diameters, thus making management of pipe couplings complicated.

SUMMARY OF THE INVENTION

It is an object of the present invention to provide a manifold electromagnetic valve, a piping system of which can be set and change over to either the manifold piping system or the valve piping system, both described above.

It is another object of the present invention to provide a pipe coupling, in which tubes of two types which are different in diameter can be selectively connected to a manifold electromagnetic valve or the like.

In the manifold electromagnetic valve according to the present invention, a plurality of electromagnetic valves are mounted on a manifold block, output ports on the side of the valve are formed in main holes of the electromagnetic valves and are controled to be opened or closed by respective valve shafts inserted into valve holes of the electromagnetic valve respectively, the manifold block is formed therein with an air supply port for supplying air as a working fluid to the respective electromagnetic valves and also formed therein with outputs ports on the side of the manifold in association with the electromagnetic valves respectively. Furthermore, the manifold electromagnetic valve has connecting members detachably mounted either on the electromagnetic valves or on the manifold block, each of which accordingly connects either outputs ports on the side of the valve or output ports on the side of the manifold to an actuator, and blocking members detachably mounted on the electromagnetic valves or the manifold block, each of which blocks either the output ports on the side of the valve or the output ports on the side of the manifold which are not connected by the connecting member.

Further, for each electromagnetic valve, there are provided two output ports on the side of the manifold and two output ports on the side of the valve, and each two output ports are selectively communicated with the air supply port due to the movement of the valve shafts. The manifold block is formed therein with air exhaust ports for commonly exhausting air as the exhausted fluid from the respective electromagnetic valves to the outside.

Accordingly, by exchanging the connecting members and the blocking members in association with the respective electromagnetic valves, the piping system of the manifold electromagnetic valve can be easily changed over to whichever of the valve piping system and the manifold piping system. The change-over of the piping systems can be easily carried out also for an actuator of a double acting type cylinder.

The pipe coupling according to the present invention comprises:

a tubular coupling main body which is fitted at a proximal end portion thereof to a pneumatic equipment and is formed therein with a communicating path communicated with said pneumatic equipment and for receiving a smaller-diameter tube;

a first fastening member mounted in a forward end portion of the coupling main body, and having a plurality of tongues inclined toward the proximal end portion, for fastening the smaller-diameter tube inserted into the coupling main body;

a sleeve provided slidably in an axial direction at an outside of the forward end portion of the coupling main body, formed therein with a through-hole communicated with the communicating path and for receiving a larger-diameter tube larger in diameter than the aforesaid smaller-diameter tube, having a first diameter-enlarging portion for pushing the tongues of the first fastening member outwardly in the radial direction by a movement of being inserted into the first fastening member thereof to release fastening of the smaller-diameter tube;

a second fastening member mounted in the sleeve, and having a plurality of tongues inclined toward the aforesaid proximal end portion, for fastening the aforesaid larger-diameter tube inserted into the sleeve; and a fastening-releasing member provided slidably in the axial direction at the forward end portion of the sleeve, and having a second diameter-enlarging portion for pushing the aforesaid tongues of the second fastening member outwardly in the radial direction by a movement being inserted into the second fastening member to release fastening of the aforesaid larger-diameter tube;

whereby selected one of the smaller-diameter tube and the larger-diameter tube being detachably mounted on the coupling main body, in fluidal communication therewith.

According to another aspect of the present invention, the pipe coupling comprises:

a tubular coupling main body which is fitted at a proximal end portion thereof to a pneumatic equipment and is formed therein with a communicating path communicated with the pneumatic equipment and for receiving a smaller-diameter tube;

a first fastening member mounted in the coupling main body, and having a plurality of tongues inclined toward the proximal end portion, for fastening the smaller-diameter tube inserted into the coupling main body;

a first fastening-releasing member provided slidably in the axial direction adjacently to the first fastening member in the coupling main body, and formed therein with a through-hole for receiving the aforesaid smaller-diameter tube, for pushing the aforesaid tongues of the first fastening member outwardly in the radial direction by movement of being inserted into the first fastening member to release fastening of the aforesaid smaller-diameter tube;

an interlocking sleeve provided slidably in the axial direction adjacently to the aforesaid first fastening member in the coupling main body, for receiving the larger-diameter tube larger in diameter than the aforesaid smaller-diameter tube;

a second fastening member provided in the aforesaid interlocking sleeve and having a plurality of tongues inclined toward the aforesaid proximal end portion, for fastening the aforesaid larger-diameter tube inserted into the interlocking sleeve; and a second fastening-releasing member provided slidably in the axial direction at the forward end portion of the coupling main body, and having a second diameter-enlarging portion for pushing the aforesaid tongues of the second fastening member outwardly in the radial direction by entering movement thereof to release fastening of the aforesaid larger-diameter tube, while pushing in the aforesaid first fastening member through the aforesaid interlocking sleeve and the first fastening-releasing member;

whereby either one of the smaller-diameter tube and the larger-diameter tube, which is selected, being detachably mounted on the coupling main body in fluidal communication therewith.

Above-described and other objects and novel features of the present invention will become apparent more fully from the description of the specification and the accompanying drawings.

BRIEF DESCRIPTION OF THE DRAWINGS

FIG. 4(a) is a front view of the blocking member;

FIG. 4(b) is a sectional view taken along the line 4b—4b in FIG. 4(a);

DETAILED DESCRIPTION OF THE INVENTION

Figure 1:
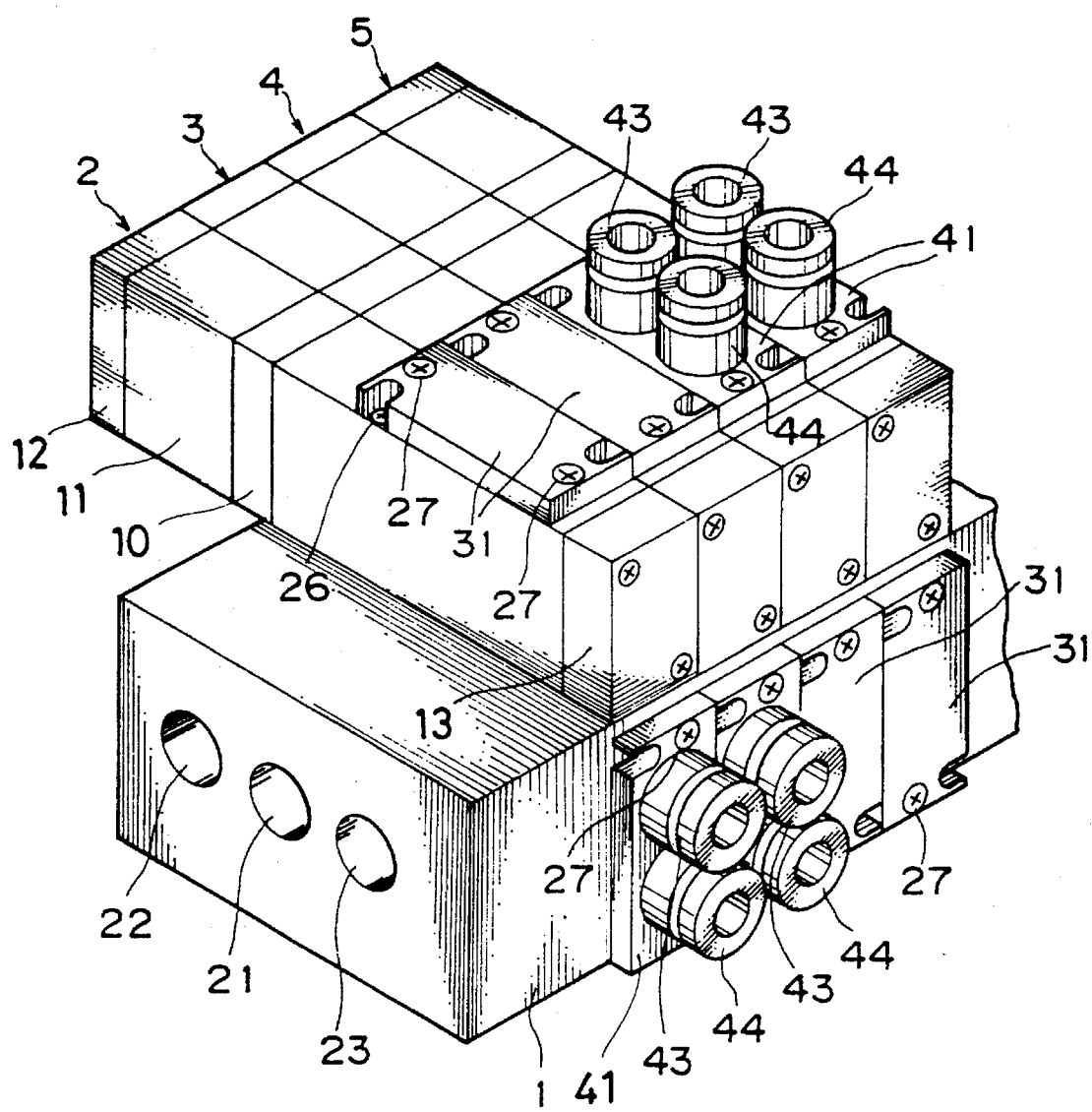
FIG. 1 is a perspective view showing an embodiment of the manifold electromagnetic valve according to the present invention.
Figure 3:
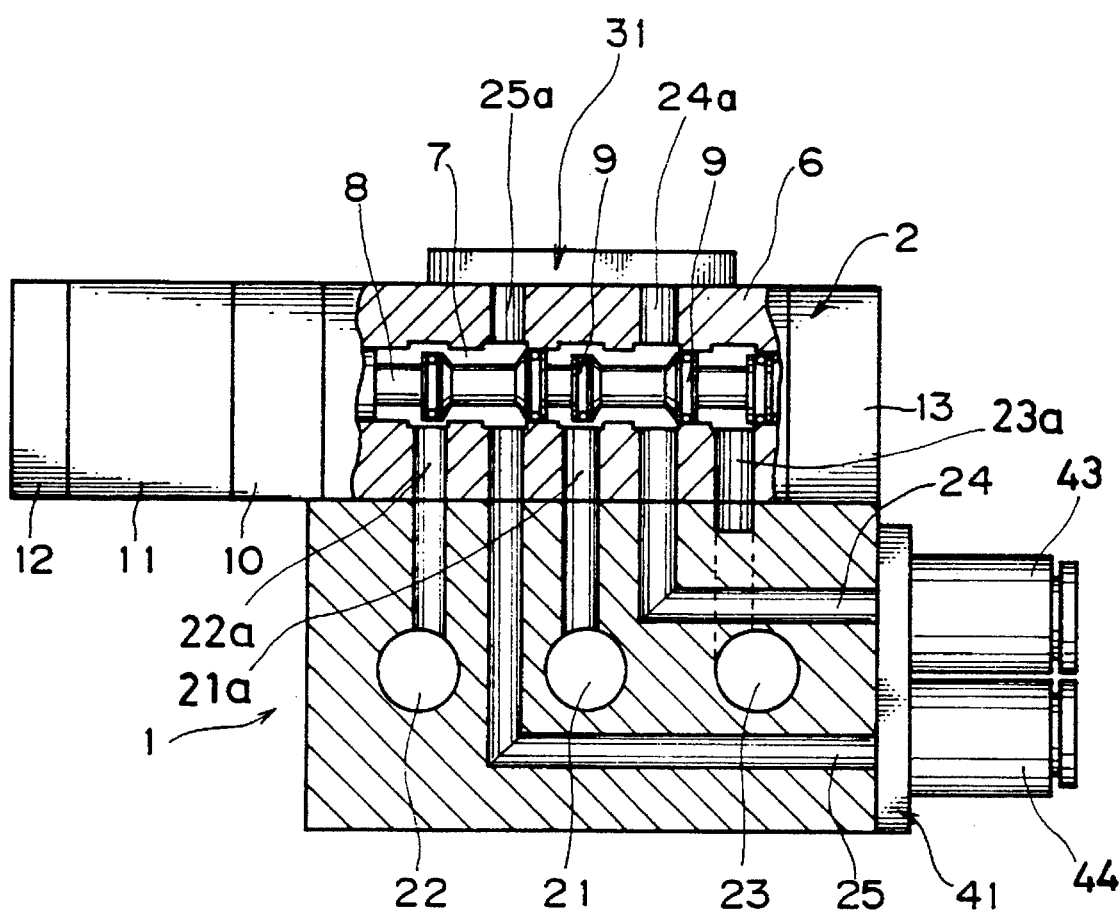
FIG. 3 is a partially cutaway front view of the manifold electromagnetic valve of FIG. 1.

A manifold electromagnetic valve shown in FIG. 1 comprises a manifold block 1 and four electromagnetic valves 2 to 5 which are mounted on the manifold block 1. FIG. 3 shows, partly in section an electromagnetic valve 2 which is one of the four electromagnetic valves 2 to 5 and the manifold block 1 at a corresponding part to the electromagnetic valve 2.

The electromagnetic valve 2 has a valve housing 6, and in a valve hole 7 formed in the valve housing 6, a valve shaft 8 formed with a plurality of valve bodies 9 is mounted movably in the axial direction. Furthermore, in this electromagnetic valve 2, a solenoid portion 11 is provided at one side of the valve housing 6 through a pilot portion 10, and covers 12 and 13 are secured to the opposite sides of the electromagnetic valve 2, respectively.

The illustrated electromagnetic valve 2 is a single solenoid type 5-port 2-position electromagnetic valve, in which electric current is passed to the solenoid portion 11 to operate the valve shaft 8. The inner constructions of the solenoid portion 11 and the pilot portion 10 are well known ones, and other electromagnetic valves 3 to 5 have the same constructions. However, a double solenoid type electromagnetic valve, in which sorenoid portions are provided at opposite sides of the valve housing 6, may be mounted on the manifold block 1.

As shown in FIG. 3, in the manifold block 1, there are provided an air supply port 21 and air exhaust ports 22 and 23, these ports 21, 22 and 23 extending in the longitudinal direction of the manifold block 1, respectively. These ports 21–23 are opened into the valve hole 7 through paths 21a–23a respectively.

Further, in the manifold block 1, are formed output ports 24 and 25 on the side of the manifold so as to communicate the valve hole 7 with the side surface of the manifold block 1. When the valve shaft 8 is disposed at a position shown in FIG. 3, the air supply port 21 is communicated with the output port 24 on the side of the manifold and the air exhaust port 22 is communicated with the output port 25 on the side of the manifold.

In the valve housing 6, output ports 24a and 25a on the side of the valve are formed in the positions corresponding to these two output ports 24 and 25 on the side of the manifold respectively, and are communicated with these output ports 24 and 25 on the side of the manifold through the valve hole 7 respectively. Accordingly, at the disposition shown in FIG. 3, the output port 24 on the side of the manifold and the output port 24a on the side of the valve are communicated with the air supply port 21, and the output port 25 on the side of the manifold and the output port 25a on the side of the valve are communicated with the air exhaust port 22 through the valve hole 7. respectively.

FIG. 3 shows the state where the valve shaft 8 is positioned left in the drawing, by, for example, breaking an electric current to the solenoid portion 11. When the current is passed to the solenoid portion 11, the valve shaft 8 is moved to the right, whereby the output port 25a on the side of the valve and the output port 25 on the side of the manifold are communicated with the air supply port 21 through the valve hole 7, while the output port 24a on the side of the valve and the output port 24 on the side of the manifold are communicated with the air exhaust port 23 through the valve hole 7.

Figure 2B:
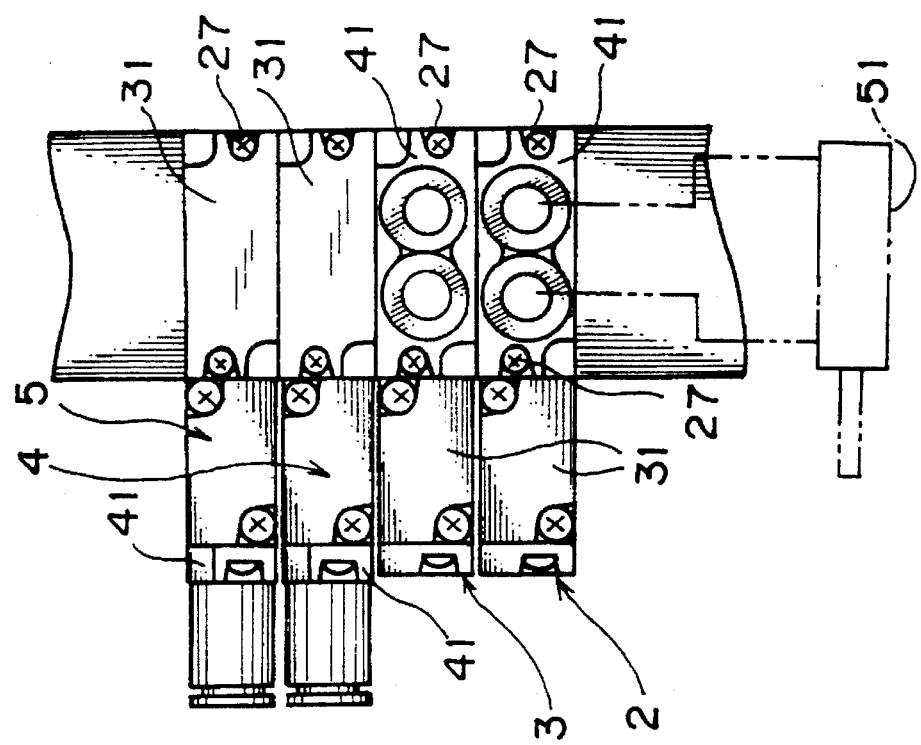
FIG. 2(b) is a side view of the manifold electromagnetic valve of FIG. 1.
Figure 2A:
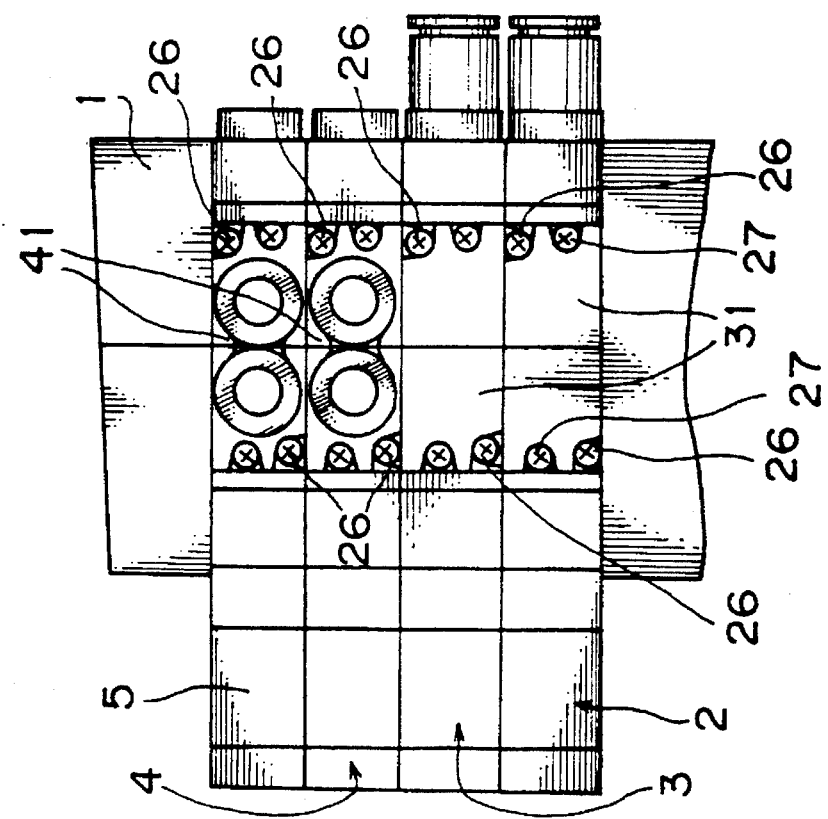
FIG. 2(a) is a plan view of the manifold electromagnetic valve of FIG. 1.

As shown in FIG. 2(a), the electromagnetic valve 2 is fastened to the manifold block 1 through two screw members 26. Also, each of other electromagnetic valves 3 to 5 is fastened to the manifold block 1 through two screw members 26.

As seen from FIGS. 1 and 3, with regard to the electromagnetic valve 2, a blocking member 31 is coupled to the valve housing 6 of the electromagnetic valve 2 through screw members 27, and a connecting member 41 is fastened to the manifold block 1 in association with the electromagnetic valve 2 through screw members 27. The blocking member 31 and the connecting member 41 are detachably mounted respectively, and can exchange their positions with each other.

As shown in FIGS. 4(a) and 4(b), the blocking member 31 is formed of a substantially rectangular plate member 32. Seal members 33 for sealing the respective output ports 24a and 25a on the side of the valve, or the respective output ports 24 and 25 on the side of the manifold are provided to the inner surface of the plate member 32. In the blocking member 31, through-holes 34 for receiving the screw members 27 are formed, and further, cutout portions 35 for avoiding the interference with the screw members 26 for fastening the electromagnetic valve 2 to the manifold block 1 are formed.

Figure 5A:
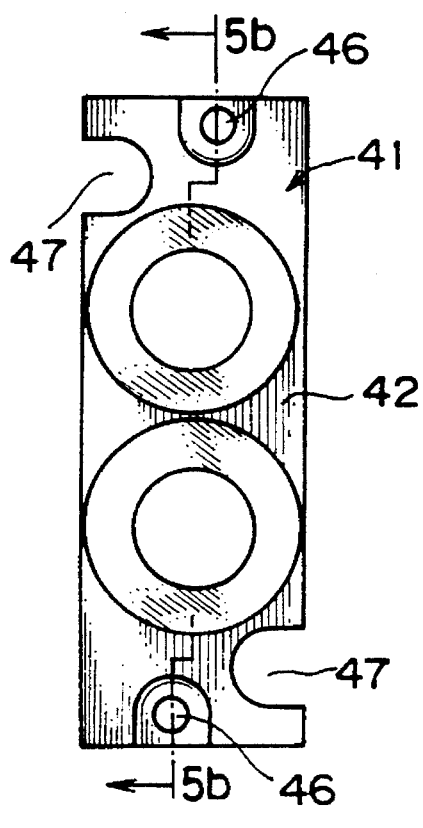
FIG. 5(a) is a front view of the connecting member.
Figure 5B:
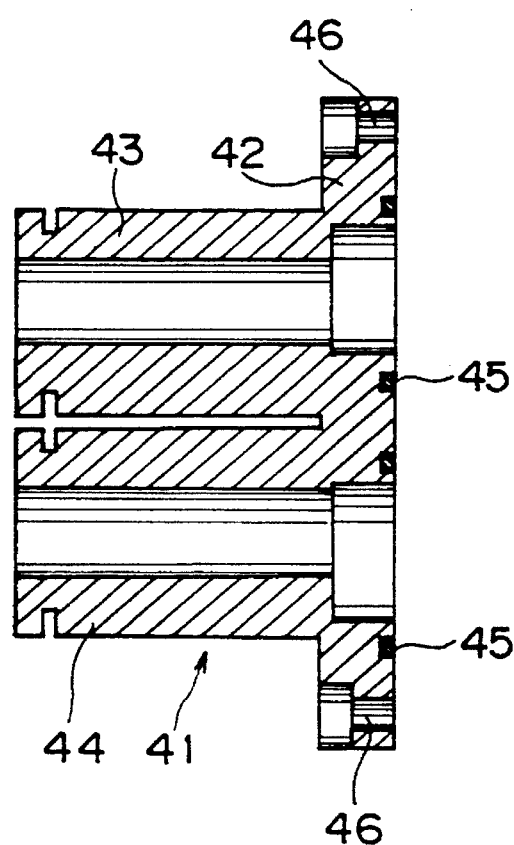
FIG. 5(b) is a sectional view taken along the line 5b—5b in FIG. 5(a)

As shown in FIGS. 5(a) and 5(b), the connecting member 41 has an end plate 42 of substantially same size and outline as the plate member 32 of the blocking member 31, and has coupling pipes (pipe couplings) 43 and 44 formed integrally with the end plate 42. Seal members 45 are provided to the inner surface of the connecting member 41. Further, this connecting member 41 is formed therein with through-holes 46 for receiving the screw members 27 and cutout portions 47 for avoiding the interference with the screw members 26. The positions of these through-holes 46 and cutout portions 47 correspond to ones of the through-holes 34 and the cutout portions 35 formed in the blocking member 31.

As shown in FIG. 2(b), a manifold piping system is obtained by connecting the output ports 24 and 25 on the side of the manifold to a cylinder chamber formed in a double acting pneumatic pressure cylinder, i.e., an actuator 51 as a pneumatic equipment through the coupling pipes 43 and 44 of the connecting member 41 secured to the manifold block 1 in association with the electromagnetic valve 2. Tubes are connected between the actuator 51 and the coupling pipes 43 and 44 respectively, and the connection between the tubes and the coupling pipes 43 and 44 is made through pipe coupling function of the latter.

On the other hand, when the connecting member 41 is secured to the valve housing 6 of the electromagnetic valve 2 and the blocking member 31 is mounted on the manifold block 1, the valve piping system can be obtained. Out of the illustrated four electromagnetic valves, the two electromagnetic valves 4 and 5 are in a state where the valve piping system is set. Accordingly, when the connecting member 41 and the blocking member 31 exchange their positions with each other, the piping systems can be exchanged without changing the manifold electromagnetic valves.

As described above, for each of the electromagnetic valve 2–5, the connecting member 41 can be secured either to the electromagnetic valve or to the manifold block 1, and the blocking member 31 is secured to the other of the electromagnetic valve and the manifold block 1, i.e. one to which the connecting member 41 is not secured. Therefore, each electomagnetic valve can be easily changed either to the piping connection of the valve piping system or to the piping connection of the manifold piping system, and the change-over of the piping connecting systems can be quickly and easily carried out.

In the illustrated case, two coupling pipes 43, 44 are provided on each connecting member 41. If, however, the connecting member 41 having only one coupling pipe 43 is prepared, then, air pressure can be supplied to a single acting cylinder. Furthermore, the illustrated electromagnetic valve is a 5-port electromagnetic valve. The number of ports, however, should not be limited to this, and, for example, a 3-port electromagnetic valve may be mounted. Further, in the case of illustration, the air supply port 21, and the air exhaust ports 22, 23 are formed in the manifold block I. However, such an arrangement may be adopted that only an air supply port is formed in a manifold block 1 and an electromagnetic valve of a type wherein exhaust is directly made therefrom may be mounted without providing an air exhaust port in the manifold block 1.

Furthermore, in the illustrated case, the four electromagnetic valves are mounted on the manifold block 1. The number of the mounted electromagnetic valves, however, should not be limited to four, and any desirable number may be adopted and electromagnetic valves different in width from one another may be mixedly used and mounted on the manifold block 1.

In the above-described manifold electromagnetic valve, the output ports to be communicated with the air supply ports are formed both in the manifold block and in the main body of the electromagnetic valve, and the connecting member and the blocking member may be exchangeably mounted on the valve housing and the manifold block, so that the piping system of the manifold electromagnetic valve can be easily changed between the valve piping system and the manifold piping system.

When the connecting members and the blocking members are prepared in advance, the manifold electromagnetic valve having the piping system of any type can be assembled, so that the manifold electromagnetic valves of both piping systems can be produced with a small number of parts being used.

Figure 6:
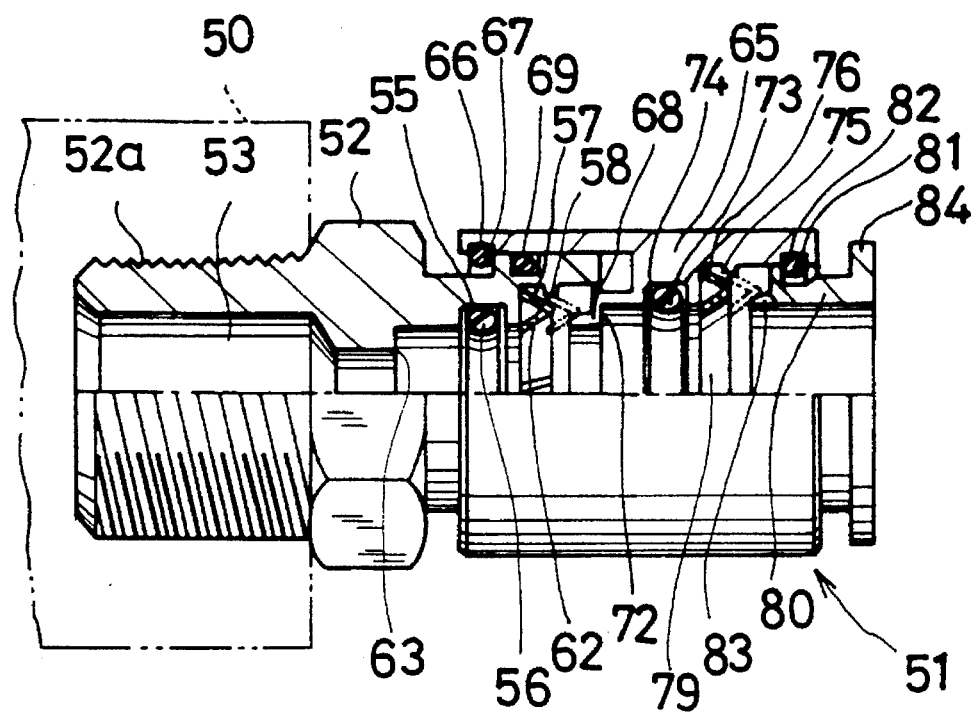
FIG. 6 is a half sectional view showing an embodiment of the pipe coupling according to the present invention.
Figure 8A:
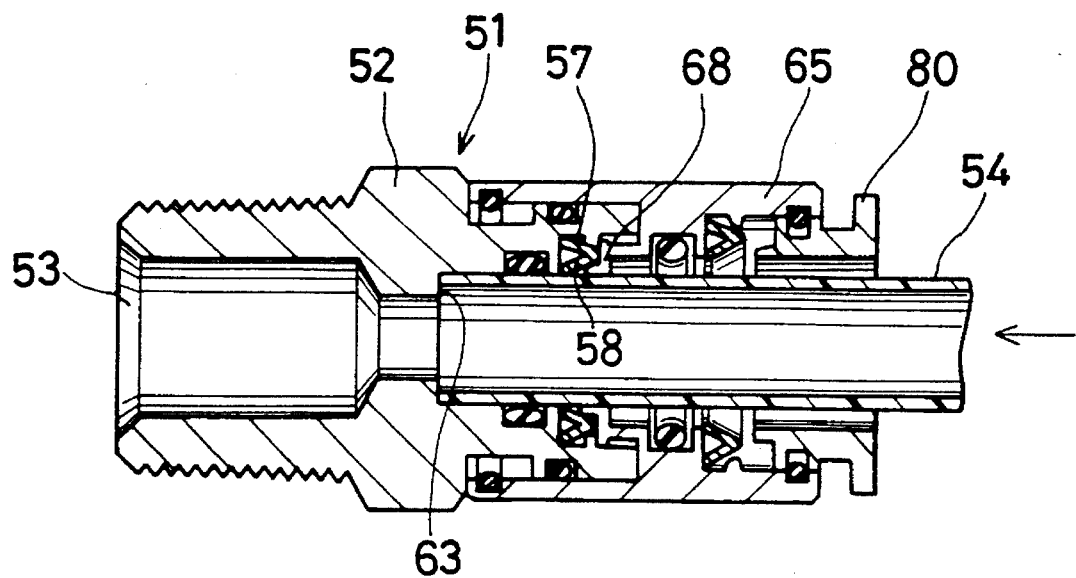
FIG. 8(a) is a sectional view showing a state where a smaller-diameter tube is inserted into the pipe coupling of in FIG. 6.
Figure 8B:
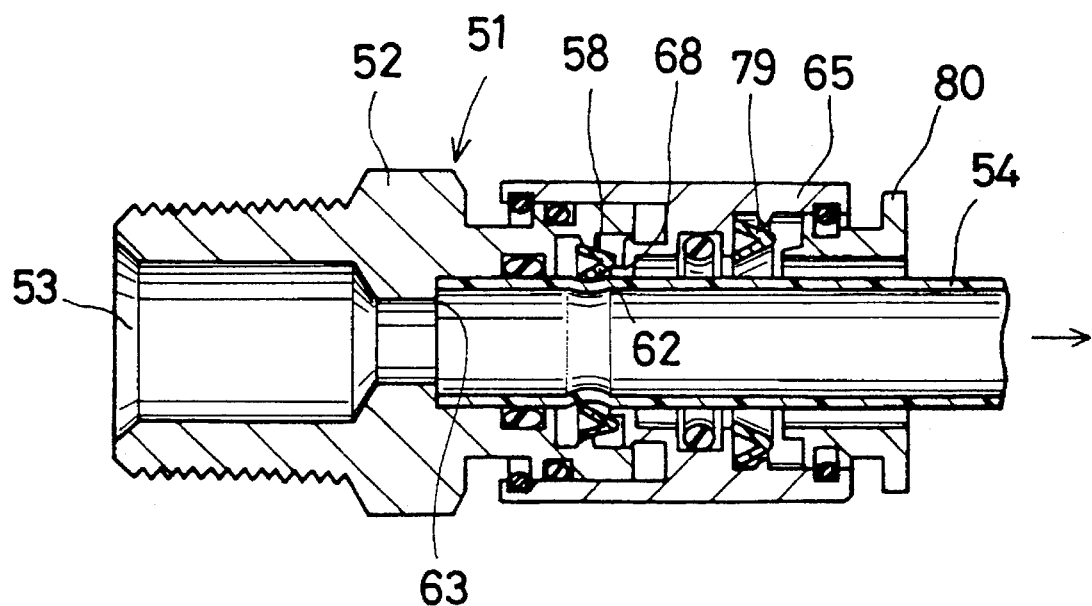
FIG. 8(b) is a sectional view showing a state where the smaller-diameter tube inserted into the pipe coupling is fastened.

A pipe coupling, i.e., pipe fitting 51 as shown in FIG. 6 is fitted to a pneumatic equipment such as the manifold block shown in FIG. 1. As illustrated, this pipe coupling 51 has a tubular coupling main body, i.e., coupling pipe 52, and fitted to a pneumatic equipment 50 such as the manifold block through the proximal end portion thereof having an external screw 52a. The coupling main body 52 is formed therein with a communicating path 53, into which is coupled a smaller-diameter tube 54 as shown in FIGS. 8(a) and 8(b). As shown in FIG. 6, in order to air-tightly seal a gap between the tube 54 and the coupling main body 52, a seal member 58 is provided in an annular groove 55 formed on the inner peripheral surface of the coupling main body 52.

Figure 7:
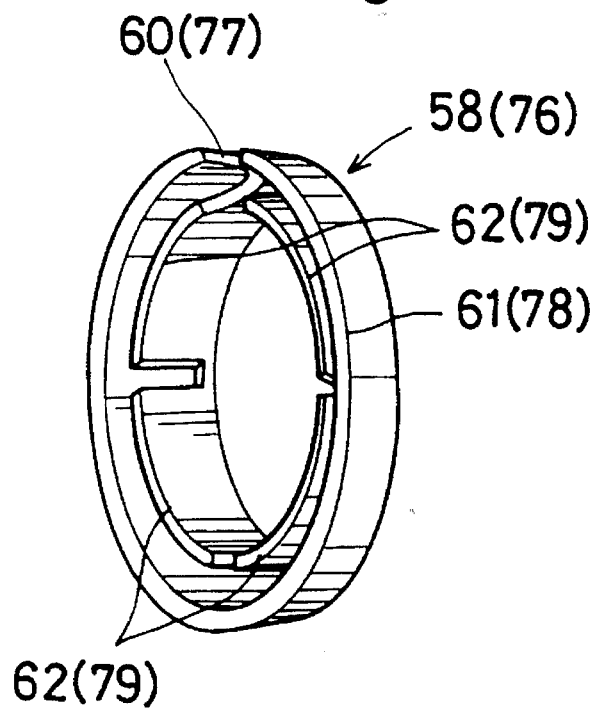
FIG. 7 is a perspective view showing the fastening member of FIG. 6.

A first fastening member 58 made of steel and having a V-shaped section, for fastening the tube 54 is mounted in a receiving groove 57 formed on the inner peripheral surface of the coupling main body 52 adjacently to the annular groove 55. As shown in FIG. 7, this fastening member 58 has a base portion 61, which is of an annular shape having a cutout portion 60, for engaging with the interior of the receiving groove 57 and a plurality of tongues 62 inclined toward the proximal end portion of the coupling main body 52 from the base portion 61. The tongues 62 are elastically deformable in the radial direction.

As shown in FIG. 8(a), the coupling main body 52 is formed with a stepped portion 63, whereby, when the tube 54 is inserted into the coupling main body 52, the forward end of the tube 54 comes into contact with the stepped portion 63, and the coupling position of the tube 54 inserted into the coupling main body 52 can be controlled.

As shown in FIG. 8(a), when the tube 54 is inserted into the coupling main body 52, the plurality of tongues 62 of the fastening member 58 are elastically deformed outwardly in the radial direction, whereby the tongues 62 come into contact with the outer peripheral surface of the tube 54 with pushing force being applied thereto. Accordingly, when the tube 54 is pulled in a direction of taking it out, as shown in FIG. 8(b), the tongues 62 bite into the tube 54 due to the self-tightening action, whereby the tube 54 is fastened by the tongues 62, so that, even if the tube 54 is pulled, the tube 54 can be prevented from being withdrawn.

As shown in FIG. 6, a sleeve 65 is provided slidably in the axial direction on the outer periphery of the forward end of the coupling main body 52. In an annular groove 66 formed on the inner peripheral surface at one end of this sleeve 65, there is provided a stop ring 67, and the sleeve 65 is prevented from falling off the coupling main body 52 by this stop ring 67. In the sleeve 65, there is provided a first diameter-enlarging portion 68 for pushing the tongues 62 of the fastening member 58 outwardly in the radial direction to release the coupling of the tube 54 when the first diameter-enlarging portion 68 is moved toward the coupling main body 52 and inserted into the fastening member 58. A seal member 69 seals a gap between the sleeve 65 and the coupling main body 52.

Figure 9A:
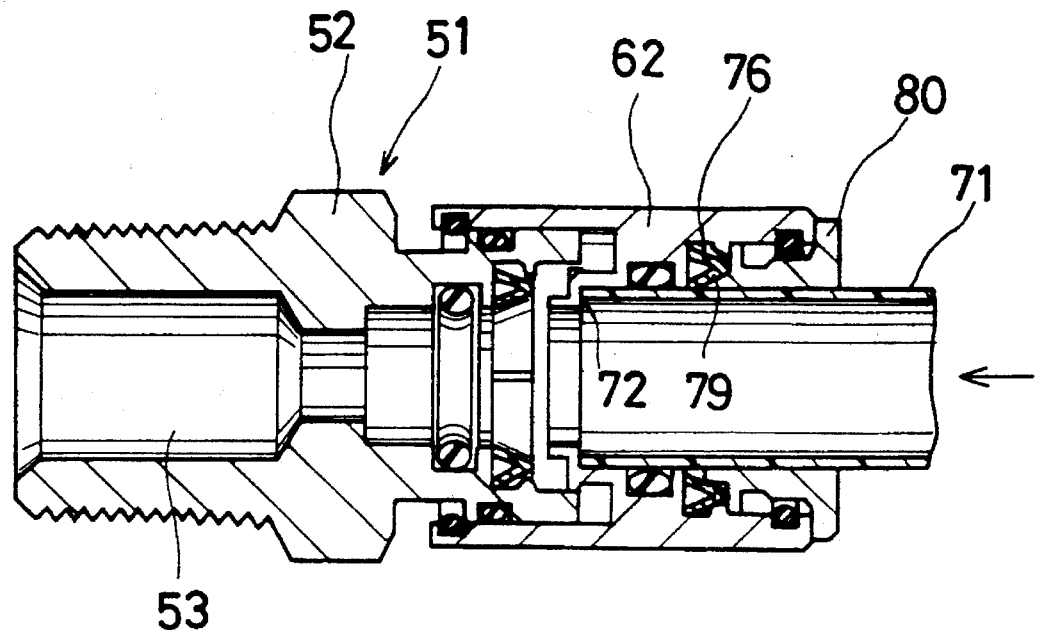
FIG. 9(a) is a sectional view showing a state where a larger-diameter tube is inserted into the pipe coupling.
Figure 9B:
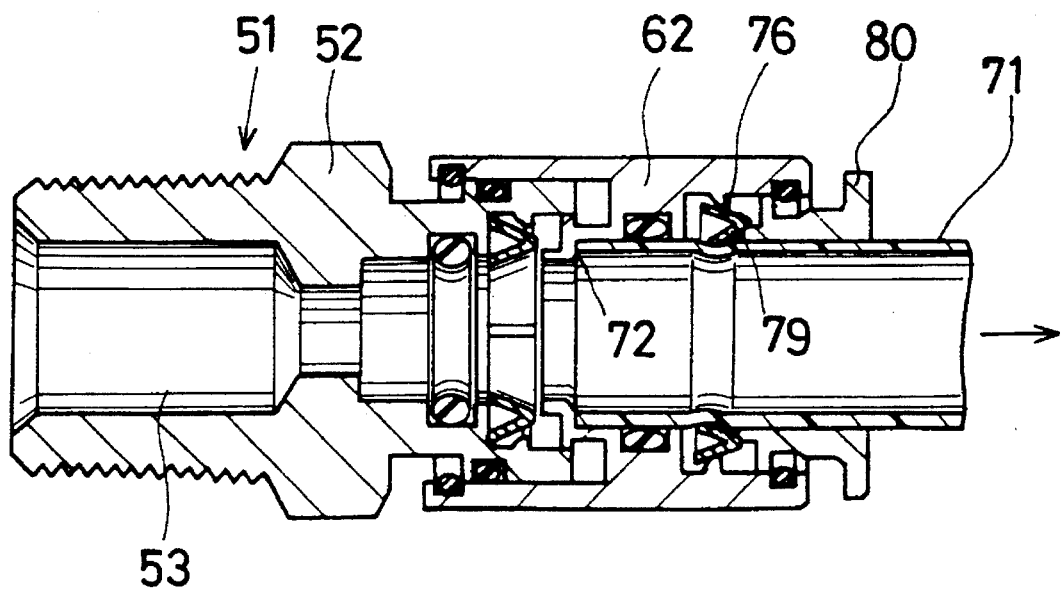
FIG. 9(b) is a sectional view showing a state where the larger-diameter tube inserted into the pipe coupling is fastened.

The sleeve 65 is formed therein with a through-hole communicated with the communicating path 53 of the coupling main body 52. As shown in FIGS. 9(a) and 9(b), a larger-diameter tube 71 larger in diameter than the tube 54 is received in this through-hole. A stepped portion 72 is provided in the sleeve 65 to come into contact with the forward end face of the tube 71 and controls the coupling position of the tube 71 when the tube 71 is inserted into the sleeve 65. As shown in FIG. 6, in order to air-tightly seal a gap between the tube 71 and the sleeve 65, a seal member 74 is provided in an annular groove 73 formed in the inner peripheral surface of the sleeve 65.

A second fastening member 76 made of steel and having a V-shaped section, for fastening the tube 71 is mounted in a receiving groove 75 formed in the inner peripheral surface of the sleeve 65 adjacently to the annular groove 73. As shown in FIG. 7, this fastening member 76 is of a shape similar to the fastening member 58 with a larger diameter than the fastening member 58, and, similarly to the fastening member 58, has a base portion 78, which is formed with a cutout portion 77, for engaging with the interior of the receiving groove 75, and a plurality of tongues inclined toward the proximal end portion of the coupling main body 52 from this base portion 78. The tongues 79 are elastically deformable in the radial direction.

As shown in FIG. 9(a), when the tube 71 is inserted into the sleeve 65, the plurality of tongues of the fastening member 76 are deformed outwardly in the radial direction, whereby the tongues 79 come into contact with the outer peripheral surface of the tube 71 with a pushing force being applied thereto. Accordingly, when the tube 71 is pulled in a direction of taking it out, as shown in FIG. 9(b), the tongues 79 bite into the tube 71 due to the self-tightening action, whereby the tube 71 is fastened by the tongues 79, and the tube 71 can be prevented from being withdrawn.

As shown in FIG. 6, a tubular fastening-releasing member 80 is provided slidably in the axial direction in the forward end portion of the sleeve 65, and the fastening-releasing member 80 is prevented from falling off the sleeve 65 by a stop ring 82 provided in an annular groove 81 formed on the inner peripheral surface of the sleeve 65.

At the forward end of the fastening-releasing member 80, there is formed a second diameter-enlarging portion 83 for pushing the tongues 79 of the second fastening member 76 by its movement of being inserted into the second fastening member 76 to release fastening of the tube 71 by the tongues 79. A flange portion 84 is formed at the rear end of the coupling releaseing member 80. Accordingly, as shown in FIG. 9(a), in a state where the larger-diameter tube 71 is connected to the pipe coupling 51, if the fastening-releasing member 80 is pushed in, then the tongues 79 of the second fastening member are deformed outwardly in the radial direction, whereby fastening of the tube 71 by the tongues 79 is released, so that the tube 71 can be removed.

As described above, either of the smaller-diameter tube and the larger-diameter tube which are different in outer diameter from each other can be selected and connected to the pipe coupling 51. Accordingly, from a state where either of the tube 54 and the tube 71 is connected to the pipe coupling 51, change to the other tube can be easily carried out. Two tubes different in diameter from each other can be connected interchangeably to the same pipe coupling, so that the number of parts is reduced.

Figure 10:
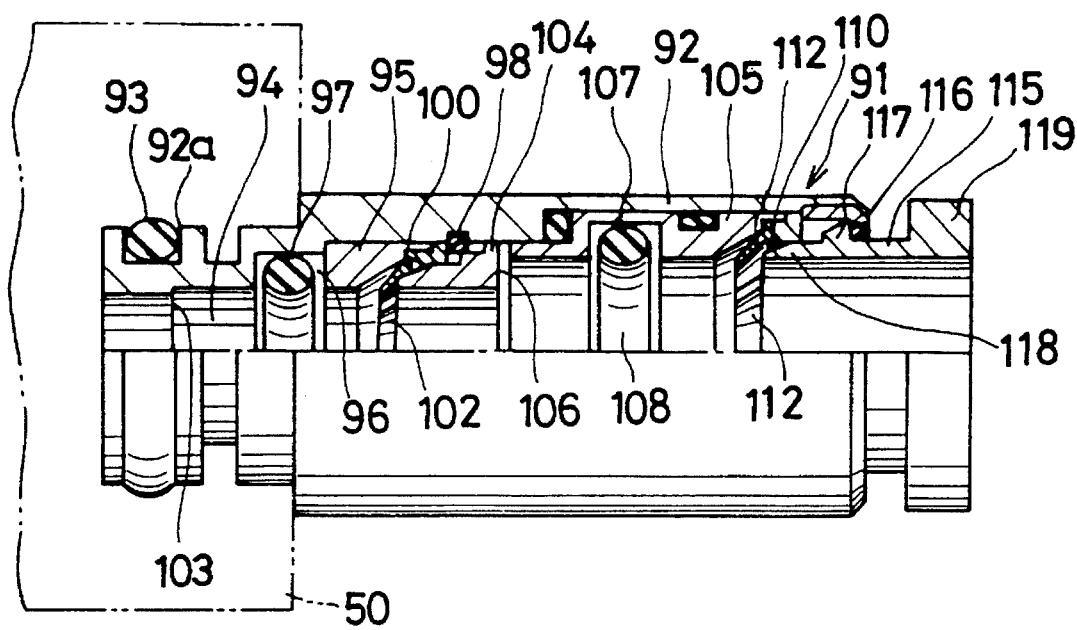
FIG. 10 is a half sectional view showing another embodiment of the pipe coupling according to the present invention.
Figure 12A:
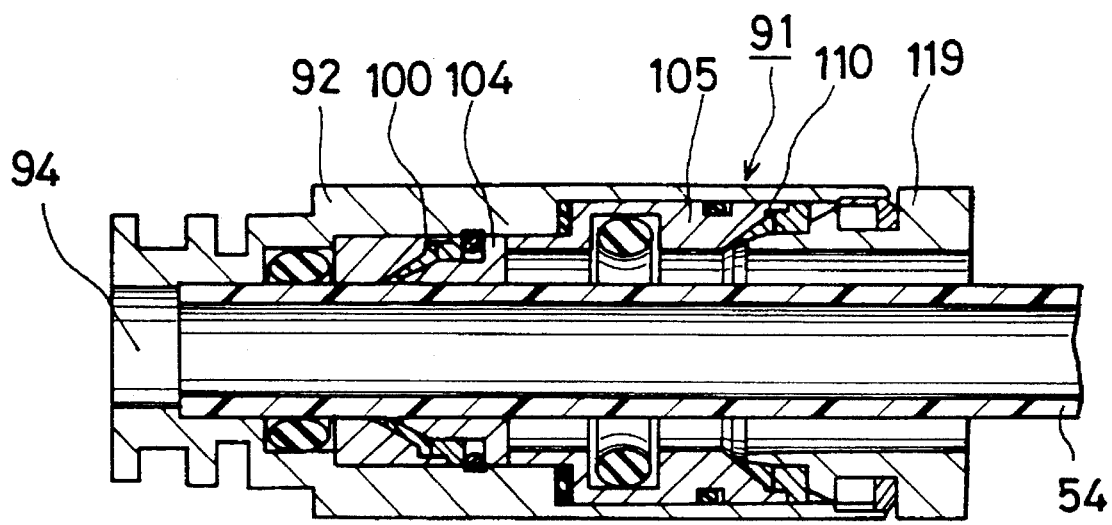
FIG. 12(a) is a sectional view showing a state where a smaller-diameter tube is inserted into the pipe coupling of in FIG. 10.
Figure 12B:
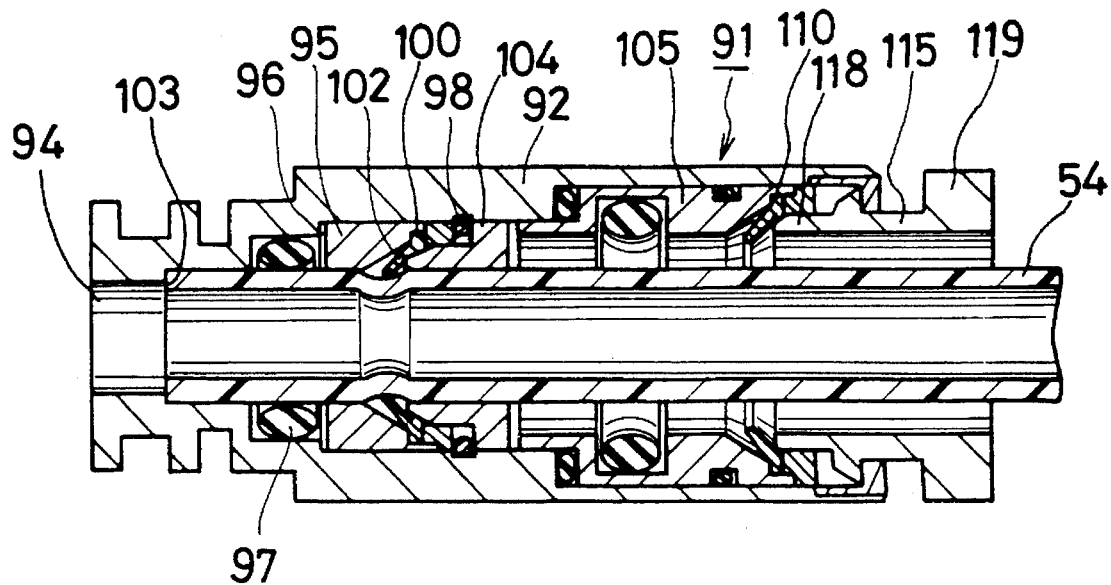
FIG. 12(b) is a sectional view showing a state where the inserted smaller-diameter tube is fastened.

FIG. 10 is a view showing a pipe coupling 91 of another type. As illustrated, this pipe coupling 91 has a tubular coupling main body, i.e., coupling pipe 92 and is fitted at the proximal end portion thereof to a pneumatic equipment 50, such as a manifold block. In this proximal end portion, there is formed an annlar groove 92a for receiving a seal member 93 for air-tightly sealing the pipe coupling 91 against the pneumatic equipment 50. The coupling main body 92 is formed therein with a communicating path 94. As shown in FIGS. 12(a) and 12(b), a smaller-diameter tube 54 is coupled into the communicating path 94. Within the coupling main body 92, there is provided an annular spacer 95. In an annular groove 96 defined by the spacer 95 in the coupling main body 92, there is provided a seal member 97 for air-tightly sealing a gap between the tube 54 and the coupling main body 92.

Figure 11:
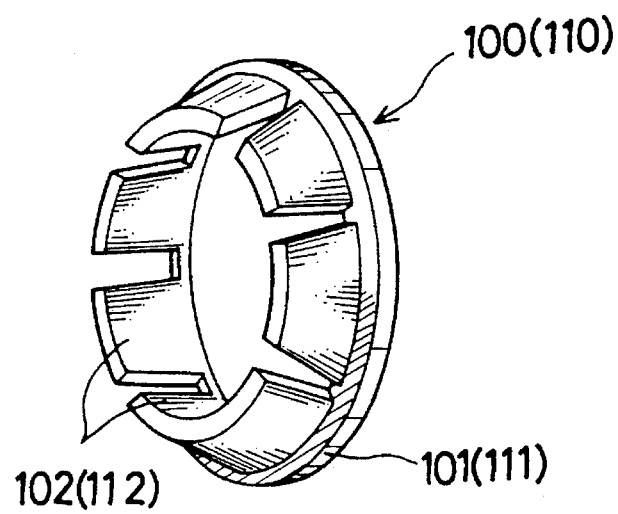
FIG. 11 is a perspective view showing the fastening member of FIG. 10.

As shown in FIG. 11, on the inner peripheral surface of the coupling main body 92 adjacently to the spacer 95, there is mounted a first fastening member 100 having an annular base portion 101 and a plurality of tongues 102 inclined toward the proximal end portion of the coupling main body 95 therefrom, each of the tongues 102 being elastically deformable in the radial direction. This first fastening member 100 is fixed to the coupling main body 92 by a stop ring 98 engaging with the interior of an annlar groove formed in the inner peripheral surface thereof.

As shown in FIG. 10, the coupling main body 52 is formed therein with a stepped portion 103, and, when the tube 54 is inserted into the coupling main body 52, the forward end of the tube 54 comes into contact with the stepped portion 103, whereby the coupling position of the tube 54 inserted into the coupling main body 52 is controlled. As shown in FIG. 12(a), when the tube 54 is inserted into the coupling main body 92, the plurality of tongues 102 of the first fastening member 100 are deformed outwardly in the radial direction, whereby the tongues 102 come into contact with the outer peripheral surface of the tube 54 with a pushing force applied thereto.

Accordingly, when the tube 54 is pulled in a direction of taking it out, as shown in FIG. 12(b), the tongues 102 bite into the tube 54 due to the self-tightening action, whereby the tube 54 is fastened by the tongues 102, so that the tube 54 can be prevented from being withdrawn.

In the coupling main body 92, there is provided slidably in the axial direction a tubular first fastening-releasing member 104 adjacently to the fastening member 100, and the tube 54 extends through a through-hole of this fastening-releasing member 104. When the fastening-releasing member 104 is moved in a direction of being inserted into the fastening member 100, the first fastening-releasing member 104 pushes the tongues 102 outwardly in the radial direction to release the fastening of the tube 54.

Figure 13A:
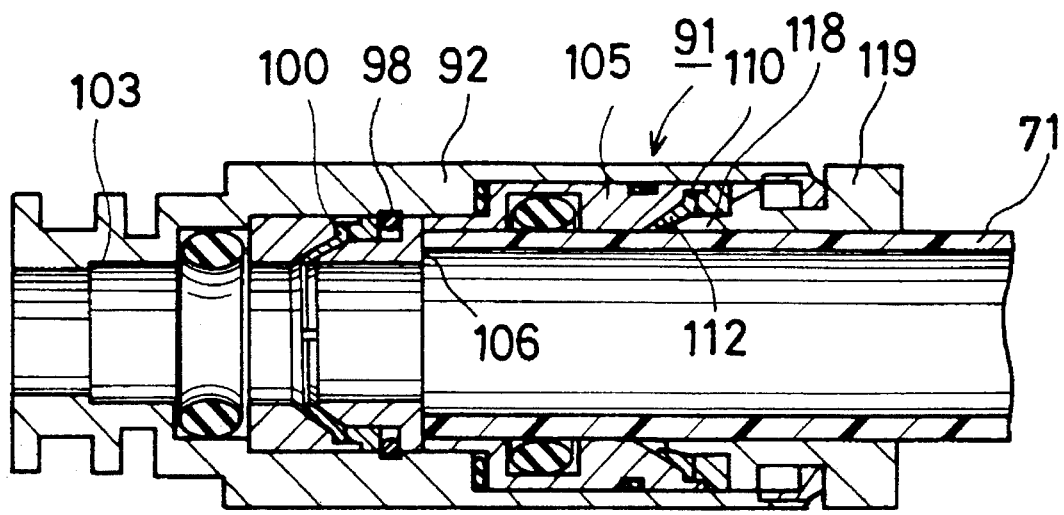
FIG. 13(a) is a sectional view showing a state where a larger-diameter tube is inserted into the pipe coupling of FIG. 10.
Figure 13B:
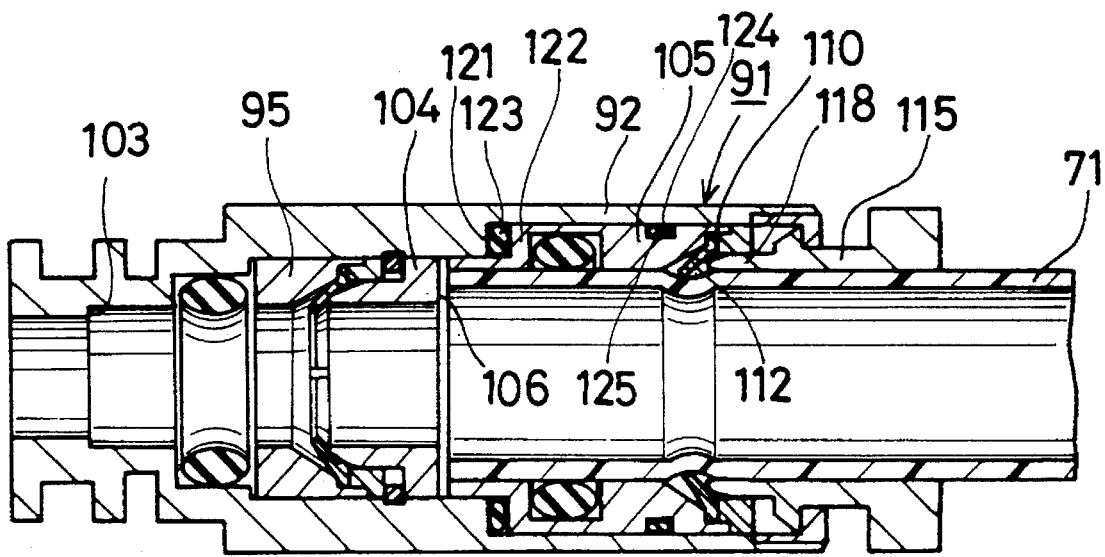
FIG. 13(b) is a sectional view showing a state where the inserted larger-diameter tube is fastened.

In the coupling main body 92, an interlocking sleeve 105 is mounted slidably in the axial direction adjacently to the first fastening-releasing member 104. As shown in FIGS. 13(a) and 13(b), in a through-hole of this interlocking sleeve 105, a larger-diameter tube 71 larger in diameter than the tube 54 is received. When the tube 71 is inserted into the interlocking sleeve 105, the forward end face of the tube 71 comes into contact with an end face 106 of the first fastening-releasing, member 104, so that the coupling position of the tube 71 is controlled. As shown in FIG. 10, in order to air-tightly seal a gap between the tube 71 and the interlocking sleeve 105, a seal member 108 is provided in an annular groove 107 formed on the inner peripheral surface of the interlocking sleeve 105.

The interlocking sleeve 105 is provided with a second fastening member 110 made of steel. This fastening member 110 is larger in diameter than the first fastening member 100 and has a shape substantially similar thereto. As shown in FIG. 11, similarly to the first fastening member 100, the second fastening member 110 has an annular base portion 111 and a plurality of tongues 112 inclined toward the proximal end portion of the coupling main body 92 therefrom. Each of the tongues 112 is elastically deformable in the radial direction.

As shown in FIG. 13(a), when the tube 71 is inserted into the interlocking sleeve 105, the plurality of tongues 112 of the fastening member 110 are deformed outwardly in the radial direction, whereby the tongues 112 come into contact with the outer peripheral surface of the tube 71 with a pushing force being applied thereto.

When the tube 71 is pulled in a direction of taking it out, as shown in FIG. 12(b), the tongues 112 bite into the tube 71 due to the self-tightening action, whereby the tube 71 is fastened by the tongues 112, so that the tube 71 can be prevented from being withdrawn.

In the forward end portion of the coupling main body 91, a tubular second fastening-releasing member 115 is provided slidably in the axial direction. A projection 117 formed on the outer periphery of the second fastening-releasing member 115 comes into contact with an annular cap 116 threadably coupled to the coupling main body 91, so that the second fastening-releasing member 115 is prevented from falling off.

At the forward end of the second fastening-releasing member 115, there is formed a second diameter-enlarging portion 118 for pushing the tongues 112 of the second fastening member 110 outwardly in the radial direction by movement of being inserted into the second fastening member 110 to release the fastening of the tube 71 by the tongues 112. A flange portion 119 is formed at the rear end of the second fastening-releasing member 115. Accordingly, as shown in FIGS. 13(a) and 13(b), in the state where the larger-diameter tube 71 is connected to the pipe coupling 91, when the second fastening-releasing member 118 is pushed in, the tongues 112 of the second fastening member 110 are deformed outwardly in the radial direction, whereby the fastening of the tube 71 by the tongues 112 is released, so that the tube 71 is pulled out to be removed.

In order to apply a resilient force to the interlocking sleeve 105 in a direction of retracting it outwardly, an elastic member 123 made of rubber is mounted between a stepped portion 121 formed on the coupling main body 92 and a stepped portion 122 formed on the interlocking sleeve 105. With this arrangement, when the pushing force in the direction of insertion, which is applied to the interlocking sleeve 105, is released, the interlocking sleeve 105 returns to its normal position. A coil spring may be used in place of the elastic member 123.

As shown in FIG. 13(b), in order to seal a gap between the coupling main body 92 and the interlocking sleeve 105, a seal member 125 is provided in an annular groove 124 formed in the outer peripheral surface of the interlocking sleeve 105.

In the state where the smaller-diameter tube 54 is connected to the pipe coupling 91 as shown in FIG. 12(a), to remove the tube 54, the second fastening-releasing member 115 is pushed in. When the second fastening-releasing member 115 is pushed in, the first fastening-releasing member 104 is pushed in through the fastening member 110 and the interlocking sleeve 105. With this arrangement, the forward end of the first fastening-releasing member 104 elastically deforms the tongues 102 of the first fastening member 100 outwardly in the radial direction, whereby the fastening of the smaller-diameter tube 54 by the first fastening member 100 is released. As described above, the second fastening-releasing member 115 is used both for releasing fastening of the larger-diameter tube 71 by the second fastening member 110 and for releasing fastening of the smaller-diameter tube 54 by the first fastening member 100.

The respective tubes 54 and 71 are made of synthetic resin. Also, a metallic tube such as a steel tube can be used. Furthermore, the coupling main bodies 51 and 91 are fitted to the manifold blocks of the manifold electromagnetic valves, respectively. However, these coupling main bodies may be fitted to various pneumatic equipments and pipes.

Figure 14:
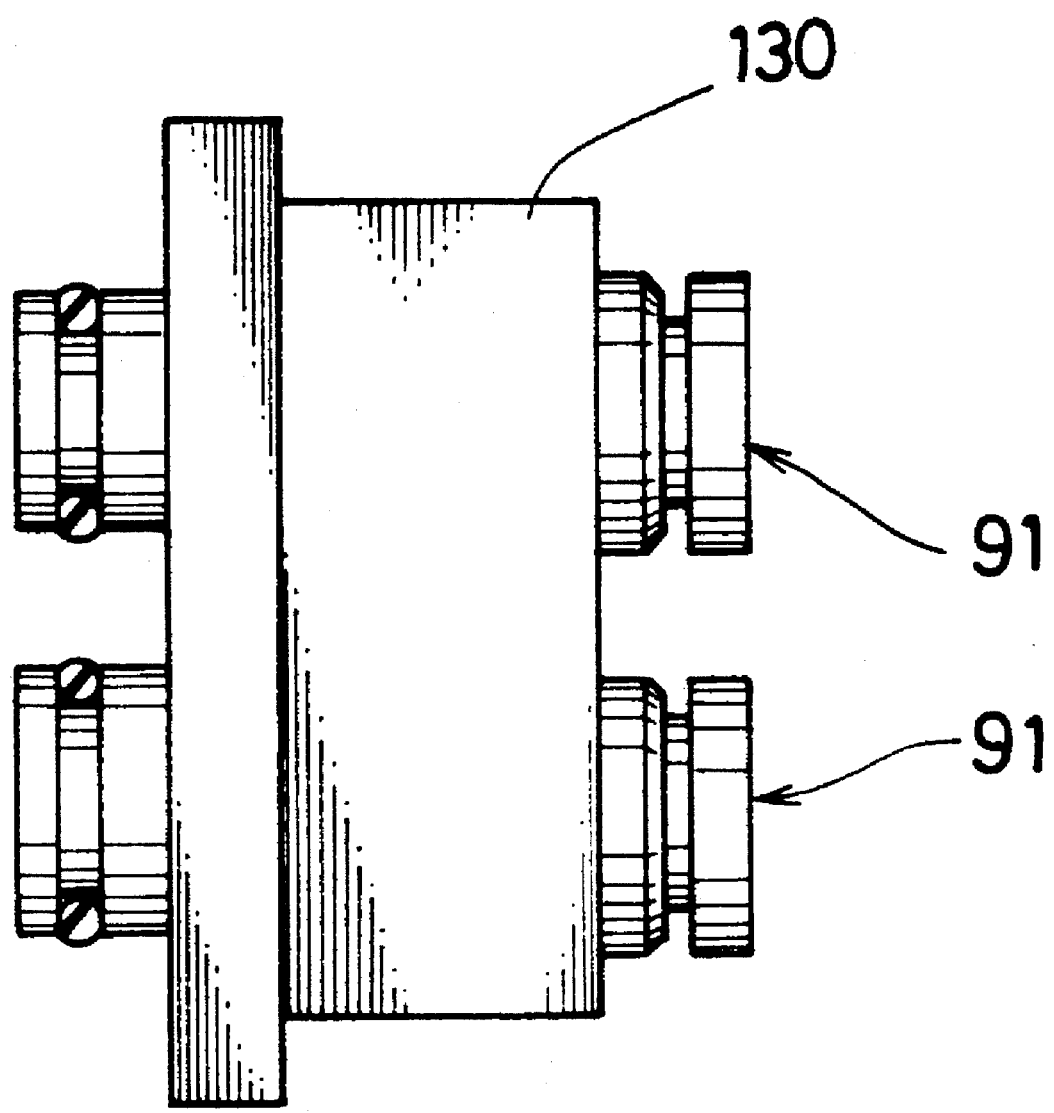
FIG. 14 is a side view showing a holder having two pipe couplings.

FIG. 14 shows a holder 130, to which two pipe couplings 91 are mounted. The proximal end portions of the respective pipe couplings 91 protrude from the holder 130. Two pipe couplings 51 also may be secured to the holder 130 in place of the pipe couplings 91.

As has been described hereinabove, the invention made by the present inventors has been explained in detail with reference to the embodiments. The present invention, however, should not be limited to the above embodiments, and it is needless to say that the present invention may be variously modified within the scope of the invention. In particular, the manifold electromagnetic valve and the coupling of the present invention have been described as ones used in pneumatic system of an air pressure type, but, these may be of oil hydraulic type, oil being used in place of air.

What is claimed is:

1. A coupling for connecting a tube to a pneumatic equipment, comprising:

a tubular coupling main body fitted at a proximal end portion thereof to said pneumatic equipment, and formed therein with a communicating path communicated with said pneumatic equipment and for receiving a smaller-diameter tube;

a first fastening member mounted in a forward end portion of said coupling main body, having a plurality of tongues inclined toward said proximal end portion, for fastening said smaller-diameter tube inserted into said coupling main body;

a sleeve provided slidably in an axial direction at an outside of the forward end portion of said coupling main body, formed therein with a through-hole for communicating with said communicating path and receiving a larger-diameter tube larger in diameter than said smaller-diameter tube, and having a first diameter-enlarging portion for pushing said tongues of said first fastening member outwardly in a radial direction by a movement of being inserted into the first fastening member to release fastening of said smaller-diameter tube;

a second fastening member mounted in said sleeve and having a plurality of tongues inclined toward said proximal end portion, for fastening said larger-diameter tube inserted into said sleeve; and a fastening-releasing member provided slidably in the axial direction at the forward end portion of said sleeve and having a second diameter-enlarging portion for pushing said tongues of said second fastening member outwardly in a radial direction by a movement of being inserted into the second fastening member to release fastening of said larger-diameter tube;

whereby either of the smaller-diameter tube and the larger-diameter tube, which is selected, being detachably mounted on said coupling main body in fluidal communication therewith.

2. The coupling as set forth in claim 1, wherein:

said coupling main body has a stepped portion which comes into contact with a forward end of said smaller-diameter tube for controlling a coupling position of said smaller-diameter tube, and said sleeve has a stepped portion which comes into contact with a forward end of said larger-diameter tube for controlling coupling position of said larger-diameter tube.

3. The coupling as set forth in claim 1, wherein:

said coupling main body is provided thereon with a seal member for coming into contact with the outer peripheral surface of said smaller-diameter tube to seal said smaller-diameter tube, and said sleeve is provided thereon with a seal member for coming into contact with the outer peripheral surface of said larger-diameter tube to seal said larger-diameter tube.

4. The coupling as set forth in claim 1, wherein:

each of said first and second fastening members has an annular portion and a plurality of protruded tongues inclined toward said proximal end portion from said annular portion.

5. A coupling for connecting tubes to a pneumatic equipment, comprising:

a tubular coupling main body fitted at a proximal end portion thereof to said pneumatic equipment, and formed therein with a communicating path communicated with said pneumatic equipment and for receiving a smaller-diameter tube:

a first fastening member mounted in said coupling main body and having a plurality of tongues inclined toward said proximal end portion, for fastening said smaller-diameter tube inserted into said coupling main body;

a first fastening-releasing member provided slidably in an axial direction adjacently to said first fastening member in said coupling main body, and formed therein with a through-hole for receiving said smaller-diameter tube, the first fastening-releasing member being for pushing said tongues of said first fastening member outwardly in a radial direction by a movement of being inserted into the first fastening member to release fastening of said smaller-diameter tube;

an interlocking sleeve provided slidably in the axial direction adjacently to said first fastening member in said coupling main body, for receiving a larger-diameter tube larger in diameter than said smaller-diameter tube;

a second fastening member provided in said interlocking sleeve and having a plurality of tongues inclined toward said proximal end portion, for fastening said larger-diameter tube inserted into said interlocking sleeve; and a second fastening-releasing member provided slidably in the axial direction at a forward end portion of said coupling main body, and having a second diameter-enlarging portion for pushing said tongues of said second fastening member outwardly in a radial direction by a movment of being inserted into the second fastening member to release fastening of said larger-diameter tube, the second fastening-releasing member pushing in said first fastening member through said interlocking sleeve and said first fastening-releasing member;

whereby either of said smaller-diameter tube and said larger-diameter tube, which is selected, being detachably mounted on said coupling main body in fluidal communication therewith.

6. The coupling as set forth in claim 5, wherein:

said coupling main body has a stepped portion for coming into contact with a forward end of said smaller-diameter tube to control a coupling position of said smaller-diameter tube, and an end face of said first fastening-releasing member comes into contact with a forward end of said larger-diameter tube to control a coupling positin of said larger-diameter tube.

7. The coupling as set forth in claim 5, wherein:

said coupling main body is provided thereon with a seal member for coming into contact with an outer peripheral surface of said smaller-diameter tube to seal said smaller-diameter tube, and said sleeve is provided thereon with a seal member for coming into contact with an outer peripheral surface of said larger-diameter tube to seal said larger-diameter tube.

8. The coupling as set forth in claim 5, wherein:

each of said first and second fastening members has an annular portion and a plurality of protruded tongues inclined toward said proximal end portion from said annular portion.

9. A coupling for connecting a tube to a pneumatic equipment, comprising;

a tubular coupling main body fitted at a proximal end portion thereof to said pneumatic equipment, and formed therein with a communicating path communicated with said pneumatic equipment and for receiving a smaller-diameter tube;

a first fastening member having a plurality of tongues inclined toward said proximal end portion, for fastening said smaller-diameter tube;

a first fastening-releasing member formed therein with a through-hole for receiving said smaller-diameter tube, the first fastening-releasing member being for pushing said tongues of said first fastening member outwardly in an axial direction by a movement of being inserted into the first fastening member to release fastening of said smaller-diameter tube;

a sleeve provided slidably in the axial direction in said coupling main body;

a second fastening member provided to said sleeve and having a plurality of tongues inclined toward said proximal end portion, for fastening said larger-diameter tube inserted into said sleeve; and a second fastening-releasing member for pushing said tongues of said second fastening member outwardly in a radial direction by a movement of being inserted into the second fastening member to release fastening of said larger-diameter tube;

whereby either of said smaller-diameter tube and said larger-diameter tube, which is selected, being detachably mounted on said coupling main body in fluidal communication therewith.

10. A valve-coupling assembly having a manifold electromagnetic valve, to which a plurality of actuators are connected through tubes respectively, for controlling operations of said actuators, comprising;

a plurality of electromagnetic valves, each having a valve housing formed therein with output ports on the side of the valve, and the output ports being on-off operated by a valve shaft mounted in a valve hole;

a manifold block mounted thereon with said plurality of electromagnetic valves, and formed therein with an air supply port for supplying air to the electromagnetic valves and output ports on the side of the manifold in association with said electromagnetic valves respectively;

connecting members, each of which being detachably mounted either on one of said electromagnetic valves or on said manifold block, and having couplings for connecting either of said output ports on the side of the valve and said output ports on the side of the manifold to said actuators; and blocking members, each of which being detachably mounted either on one of said electromagnetic valves or on said manifold block for blocking either of said output ports on the side of the valve and said output ports on the side of the manifold;

each of said couplings comprising:

a tubular coupling main body fitted at a proximal end portion thereof to said connecting member and to be connected to one of the output ports, and formed therein with a communicating path for receiving a smaller-diameter tube;

a first fastening member having a plurality of tongues inclined toward said proximal end portion, for coupling said smaller-diameter tube;

a first fastening-releasing member formed therein with a through-hole for receiving said smaller-diameter tube, for pushing said tongues of said first fastening member outwardly in a radial direction by inserting movement thereof to release fastening of said smaller-diameter tube;

a sleeve provided slidably in an axial direction in said coupling main body;

a second fastening member provided in said sleeve, and having a plurality of tongues inclined toward said proximal end portion for coupling said larger-diameter tube inserted into said sleeve; and a second fastening-releasing member for pushing said tongues of the second fastening member outwardly in a radial directin by inserting movement thereof toward said coupling main body to release fastening of said larger-diameter tube;

whereby either of said smaller-diameter tube and said larger-diameter tube, which is selected, being detachably mounted on said coupling main body influidal communication therewith.

* * * * *